United States Patent [19]

Yamada et al.

[11] Patent Number: 5,128,290

[45] Date of Patent: Jul. 7, 1992

[54] CERAMIC DIELECTRIC MATERIALS FOR MICROWAVE USE AND A METHOD FOR PRODUCING THEREOF

[75] Inventors: Akira Yamada; Toshihisa Honda; Hisao Watarai; Kiyoshi Saitou; Yoshikazu Utsumi, all of Amagasaki, Japan

[73] Assignee: Mitsubishi Denki Kabushiki Kaisha, Tokyo, Japan

[21] Appl. No.: 721,263

[22] Filed: Jun. 26, 1991

[30] Foreign Application Priority Data

Jul. 13, 1990 [JP] Japan .................................. 2-186196

[51] Int. Cl.$^5$ ............................................. C04B 35/46
[52] U.S. Cl. ...................................... 501/138; 501/139
[58] Field of Search .................................. 501/138, 139

[56] References Cited

U.S. PATENT DOCUMENTS

| | | | |
|---|---|---|---|
| 4,330,631 | 5/1982 | Kawashima et al. | 501/139 |
| 4,442,220 | 4/1984 | Ouchi et al. | 501/139 |
| 4,550,089 | 10/1985 | Ayusawa et al. | 501/139 |
| 4,610,970 | 9/1986 | Wada et al. | 501/138 |
| 4,699,891 | 10/1987 | Sato et al. | 501/139 |

FOREIGN PATENT DOCUMENTS

| | | | |
|---|---|---|---|
| 57-170874 | 10/1982 | Japan | 501/139 |
| 57-174806 | 10/1982 | Japan | 501/139 |
| 59-37526 | 9/1984 | Japan | |
| 63-294609 | 12/1988 | Japan | |

*Primary Examiner*—William R. Dixon, Jr.
*Assistant Examiner*—Anthony J. Green
*Attorney, Agent, or Firm*—Rothwell, Figg, Ernst & Kurz

[57] ABSTRACT

The present invention provides microwave ceramic dielectric materials having large relative dielectric constant, very large Q, and stable and small temperature coefficient.

The ceramic dielectric materials of the present invention are expressed by the general formula:

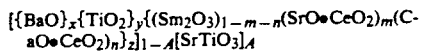

$[\{BaO\}_x\{TiO_2\}_y\{(Sm_2O_3)_{1-m-n}(SrO\bullet CeO_2)_m(CaO\bullet CeO_2)_n\}_z]_{1-A}[SrTiO_3]_A$ wherein, $0.1 \leq x \leq 0.25$, $0.6 \leq y \leq 0.85$, $0.05 \leq z \leq 0.3$, $0 \leq m \leq 0.80$, $0 \leq n < 0.8$, $x+y+z=1$, $m+n \leq 0.8$, $x+y+z=1$, $0 < A \leq 0.40$; x,y,z are expressed by mol fraction.

2 Claims, No Drawings

CERAMIC DIELECTRIC MATERIALS FOR MICROWAVE USE AND A METHOD FOR PRODUCING THEREOF

BACKGROUND OF THE INVENTION

The present invention relates to ceramic dielectric materials used for microwave frequency applications and having a large relative dielectric constant, very large Q (inverse value of dielectric loss) for practical use and stable and small temperature coefficient, and a method for producing such ceramic dielectric materials.

Nowadays dielectrics for microwave frequency applications are used for resonator, filter, branching filters, and Microwave Integrated Circuit substrate (MIC substrate). It is very desirable to improve the dielectric characteristic for stabilizing sending and receiving frequencies, for improving filter characteristic and for miniaturizing communication equipments and circuits which are recently very often used.

The following are necessary characteristics for the above mentioned dielectrics.

(1) Large relative dielectric constant.

The bulk of dielectric application devices is inversely proportional to the square root of relative dielectric constant. Therefore it is very important for the miniaturization of apparatus or devices to have a large relative dielectric constant.

(2) Low dielectric loss.

(3) Good characteristics for the temperature stability at resonance frequency.

In the prior art, some of the dielectrics having the above characteristics are described in the Japanese patent publication No. 59-37526/1984 in the form of general formula:

$$(BaO)_x(TiO_2)_y(Sm_2O_3)_z;$$

wherein, $5 \leq x \leq 23$, $57 \leq y \leq 82.5$, $2.5 \leq z \leq 37.5$, $x+y+z=100$; x,y,z are expressed by mol percentage.

Some of the dielectrics are also described in the Japanese laying-open patent publication No. 63-294609/1988 in the form of general formula:

$$\{BaO\}_x\{TiO_2\}_y\{(Sm_2O_3)_{1-m-n}(SrO \bullet CeO_2)_m(CaO \bullet CeO_2)_n\}_z$$

wherein, $0.1 \leq x \leq 0.25$, $0.6 \leq y \leq 0.85$, $0.05 \leq z \leq 0.30$, $0 \leq m \leq 0.80$, $0 \leq n < 0.8$, $x+y+z=1$, $m+n \leq 0.8$; x,y,z are expressed by mol fraction.

Nowadays, microwave communication apparatus is becoming smaller and lighter. From this point of view, each part of the electrical communication apparatus is required to be miniaturized.

In the prior art, some dielectrics have a relatively large relative dielectric constant of about 84 in maximum value, large Q value and low temperature coefficient. But, such prior dielectric materials were not suitable for more miniaturizing of the apparatus or devices, because larger dielectric constant was required for assembling smaller apparatus or devices.

For assembling small apparatus or devices, therefore, it is necessary to use very large relative dielectric constant of the dielectric materials. From this point of view it has thus far been very difficult to find very large dielectric constant materials for practical use.

SUMMARY OF THE INVENTION

It is an object of the present invention to provide small size microwave apparatus and devices having a large relative dielectric constant compared with the former dielectrics, large Q value for practical use, and a stable and small temperature coefficient.

In the present invention, a composition of the ceramic dielectric materials is expressed by the following general formula:

$$[\{BaO\}_x\{TiO_2\}_y\{(Sm_2O_3)_{1-m-n}(SrO \bullet CeO_2)_m(CaO \bullet CeO_2)_n\}_z]_{1-A}[SrTiO_3]_A$$

wherein, $0.1 \leq x \leq 0.25$, $0.6 \leq y \leq 0.85$, $0.05 \leq z \leq 0.3$, $0 \leq m \leq 0.80$, $0 \leq n < 0.8$, $x+y+z=1$, $m+n \leq 0.8$, $x+y+z=1$, $0 < A \leq 0.40$; x,y,z are expressed by mol fraction.

According to the invention, one of the aforementioned objects "very large Q", is attained by substituting for part of the ingredients (SrO.CeO₂) and (CaO.CeO₂) a part of the ingredient Sm₂O₃ in the prior ceramic dielectric of BaO-TiO₂-Sm₂O₃ group, and other objects "large relative dielectric constant" are attained by adding the ingredient SrTiO₃.

It is another object of the present invention to provide a method for producing ceramic dielectric materials having large relative dielectric constant compared with the former ceramic dielectric, large Q value for practical use, and stable and small temperature coefficient.

DETAILED DESCRIPTION OF THE PREFERRED EMBODIMENTS

In the present invention, BaCO₃, TiO₂, Sm₂O₃, CaCO₃, SrCO₃, CeO₂, Mn₂O₃, SrTiO₃ having very large chemical purity were used for starting materials. These materials were weighed and compounded and mixed (except initially for SrTiO₃) so that the ingredients in the composition formula, expressed in the form of $$[\{BaO\}_x\{TiO_2\}_y\{(Sm_2O_3)_{1-m-n}(SrO \bullet CeO_2)_m(CaO \bullet CeO_2)_n\}_z]_{1-A}[SrTiO_3]_A$$

in accordance with the respective values (except for SrTiO₃) in Table 1. Table 1 shows mixing ratio of the ingredients and the results of many examples produced according to the general formula of the present invention. Then the mixed materials were calcinated for about two hours in the air at the temperature of 1000 to 1200 degree centigrade. After grinding the above calcinated materials in the mortar or ball mill, the predetermined quantity of SrTiO₃ was mixed in the materials. The ground powders made by mixing in accordance with the former process, were molded to a column shape of 12 mm diameter, 15 mm height, or a disk shape of 12 mm diameter, 2 mm height at the environment of 800 Kg/cm² pressure. Ceramic dielectrics obtained by the above molding process were kept in the temperature of about 1300 to 1500 degree centigrade for 4 to 50 hours in an oxygen atmosphere. The surfaces of the obtained ceramic dielectrics were ground respectively. Then the Q value and relative dielectric constant of the dielectrics were measured by the dielectric column resonance method between parallel conductors at 6 GHz. Then the temperature coefficient ($\tau_k$) of the ceramic dielectric was measured at temperatures of −10 to 50 degree centigrade.

The measured results are shown in Table 1. In Table 1, the asterisk (*) marks show examples of the characteristics of the prior ceramic dielectrics which are shown in order to compare them with the ceramic dielectrics of the present invention. Data without the (*) mark show the characteristics of the ceramic dielectric of the present invention. In the sample numbers 20, 21, 24, 25, $Mn_2O_3$ was included as a sub ingredient. In the sample numbers 25, 29, temperature coefficient ($\tau_k$) is not measured because the Q values are too small.

As the effects and limits of each ingredient are very complex, it is difficult to decide the quantity of each ingredient independently in order to obtain expected characteristics. But it is evident that Q value increases according to the contents of the ingredients ($SrO \bullet CeO_2$), ($CaO \bullet CeO_2$) by comparing with samples 2, 3 and 8, 10 in the Table 1. It is also evident that relative dielectric constant increases according to the content of the ingredient $SrTiO_3$ by comparing with samples numbered 3, 4, 12, 13, 16, 17. Further it is evident that the content of the ingredient ($SrO.CeO_2$) shifts the temperature coefficient ($\tau_k$) to the minus side, and the content of the ingredient ($CaO \bullet CeO_2$) shifts the temperature coefficient to the plus side and the contents of the ingredient $SrTiO_3$ shifts the temperature coefficient ($\tau_k$) to the minus side from the comparison results of the samples numbered 6, 7, 10, 12, 13, 16, 17. That is, the temperature coefficient can be arbitrary controlled by changing the contents of the above three ingredients ($SrO \bullet CeO_2$), ($CaO \bullet CeO_2$) and $SrTiO_3$.

Further, the Table 1 explains from the comparison result with the samples 11 and 20 that the relative dielectric constant increases a little by including the sub-ingredient $Mn_2O_3$.

As described above, the ceramic dielectric of the invention has a large relative dielectric constant and large Q and also it is easily able to compensate the temperature coefficient of the relative dielectric constant at the microwave frequency band. When the mol fraction x of the ingredient BaO is larger than 0.25 or the mol fraction y of the ingredient $TiO_2$ becomes smaller than 0.60, the relative dielectric constant and Q value become smaller. Also when the mol fraction of the ingredient $SrTiO_3$ equals to 0.00, the relative dielectric constant decreases. As described above, if the dielectric constant and Q value are reduced to a great extent, the ceramic dielectric materials becomes inadequate for microwave use. Also the reduction of dielectric constant and Q value occur when the sum (m+n) of the mol fraction of the ingredients ($SrO \bullet CeO_2$) and ($CaO \bullet CeO_2$) is greater than 0.8, or sub-ingredient $Mn_2O_3$ is included over 3 wt %. As mol fraction x of the ingredient BaO is smaller than 0.1 and mol fraction y of the ingredient $TiO_2$ is greater than 0.85, the absolute value of the temperature coefficient ($\tau_k$) becomes larger. As a result it becomes more difficult to use the above dielectric for a device. When the mol fraction of the ingredient $SrTiO_3$ is greater than 0.4, Q value decreases and it becomes insufficient for industrial materials use. And when m is greater than 0.8 or n is greater than or equal to 0.8, then the relative dielectric constant decreases.

In the above embodiments, $BaCO_3$, $TiO_2$, $Sm_2O_3$, $CaCO_3$, $SrCO_3$, $CeO_2$, $Mn_2O_3$, $SrTiO_3$ are used as starting materials. These starting materials are not restricted to only such materials. Any kind of compound including a metal ingredient, for example complex oxide such as $BaTiO_3$, can be used as the occasion demands.

As will be understood from Table 1, the embodiments of the present invention provide the ceramic dielectric materials showing the value of 97 of relative dielectric constant. And also the embodiments of the present invention provide the ceramic dielectric materials having larger relative dielectric constant value rather than before, and having large Q value sufficient for practical use, and having the temperature coefficient controllable at about 0 ppm/degree centigrade, by substituting for part of the ingredients ($SrO.CeO_2$) and ($CaO.CeO_2$) a part of the ingredient $Sm_2O_3$ in the prior ceramic dielectric of $BaO$-$TiO_2$-$Sm_2O_3$ group, and by adding the ingredient $SrTiO_3$.

Also when the ingredient $Mn_2O_3$ is included in the compound, sinterability of the ceramic dielectric is further improved and a ceramic dielectric having a larger relative dielectric constant can be obtained.

TABLE 1

| Sample No. | Mol fraction of main ingredients | | | | | | $Mn_2O_3$ Addition quantity (wt %) | $\epsilon_r$ | Q | $\tau_k$ |
|---|---|---|---|---|---|---|---|---|---|---|
| | x | y | z | m | n | A | | | | |
| *1 | 0.03 | 0.92 | 0.05 | 0.00 | 0.80 | 0.20 | 0 | 64 | 510 | −470 |
| *2 | 0.10 | 0.60 | 0.30 | 0.00 | 0.00 | 0.00 | 0 | 60 | 240 | −191 |
| 3 | 0.10 | 0.60 | 0.30 | 0.10 | 0.10 | 0.10 | 0 | 85 | 840 | −195 |
| 4 | 0.10 | 0.60 | 0.30 | 0.10 | 0.10 | 0.20 | 0 | 90 | 800 | −223 |
| 5 | 0.10 | 0.77 | 0.13 | 0.25 | 0.25 | 0.05 | 0 | 86 | 1610 | +59 |
| 6 | 0.10 | 0.85 | 0.05 | 0.00 | 0.80 | 0.12 | 0 | 88 | 1240 | −34 |
| 7 | 0.10 | 0.85 | 0.05 | 0.80 | 0.00 | 0.05 | 0 | 86 | 890 | −163 |
| 8 | 0.10 | 0.85 | 0.05 | 0.75 | 0.05 | 0.05 | 0 | 85 | 810 | −210 |
| *9 | 0.16 | 0.68 | 0.16 | 0.00 | 0.00 | 0.00 | 0 | 81 | 990 | −52 |
| 10 | 0.16 | 0.68 | 0.16 | 0.00 | 0.50 | 0.01 | 0 | 86 | 1830 | +166 |
| 11 | 0.16 | 0.68 | 0.16 | 0.05 | 0.10 | 0.10 | 0 | 85 | 1050 | −20 |
| 12 | 0.16 | 0.68 | 0.16 | 0.10 | 0.50 | 0.05 | 0 | 85 | 1500 | +152 |
| 13 | 0.16 | 0.68 | 0.16 | 0.10 | 0.50 | 0.25 | 0 | 94 | 1070 | +20 |
| 14 | 0.16 | 0.68 | 0.16 | 0.00 | 0.80 | 0.40 | 0 | 88 | 800 | −297 |
| 15 | 0.16 | 0.68 | 0.16 | 0.10 | 0.30 | 0.20 | 0 | 91 | 1150 | −17 |
| 16 | 0.16 | 0.68 | 0.16 | 0.25 | 0.25 | 0.14 | 0 | 92 | 1270 | −21 |
| 17 | 0.16 | 0.68 | 0.16 | 0.25 | 0.25 | 0.30 | 0 | 97 | 1050 | −212 |
| *18 | 0.16 | 0.68 | 0.16 | 0.40 | 0.45 | 0.10 | 0 | 72 | 520 | −275 |
| *19 | 0.16 | 0.68 | 0.16 | 0.45 | 0.40 | 0.10 | 0 | 73 | 600 | −311 |
| 20 | 0.16 | 0.68 | 0.16 | 0.05 | 0.10 | 0.10 | 3 | 86 | 950 | −13 |
| *21 | 0.16 | 0.68 | 0.16 | 0.05 | 0.10 | 0.10 | 5 | 80 | 540 | −87 |
| 22 | 0.20 | 0.60 | 0.20 | 0.00 | 0.01 | 0.25 | 0 | 92 | 1020 | −110 |
| 23 | 0.20 | 0.60 | 0.20 | 0.10 | 0.10 | 0.25 | 0 | 91 | 850 | −142 |
| 24 | 0.20 | 0.60 | 0.20 | 0.25 | 0.55 | 0.40 | 0.3 | 86 | 780 | −265 |

TABLE 1-continued

| Sample No. | Mol fraction of main ingredients | | | | | | $Mn_2O_3$ Addition quantity (wt %) | $\epsilon_r$ | Q | $\tau_k$ |
| --- | --- | --- | --- | --- | --- | --- | --- | --- | --- | --- |
| | x | y | z | m | n | A | | | | |
| *25 | 0.20 | 0.60 | 0.20 | 0.25 | 0.55 | 0.50 | 0.3 | 96 | <100 | — |
| 26 | 0.25 | 0.60 | 0.15 | 0.05 | 0.15 | 0.15 | 0 | 86 | 950 | −40 |
| 27 | 0.25 | 0.60 | 0.15 | 0.20 | 0.30 | 0.15 | 0 | 85 | 1010 | −78 |
| *28 | 0.25 | 0.55 | 0.20 | 0.05 | 0.10 | 0.30 | 0 | 70 | 750 | −325 |
| *29 | 0.29 | 0.70 | 0.01 | 0.05 | 0.10 | 0.10 | 0 | 66 | <100 | — |

$\epsilon_r$: relative dielectric constant
Q: 1/dielectric loss
$\tau_k$: temperature coefficient of relative dielectric constant
*comparative samples which are not included in the present invention.
(note) Composition ratio A of $SrTiO_3$ is mol ratio for $BaO—TiO_2—[Sm_2O_3—(SrO.CeO_2)—(CaO.CeO_2)]$

What is claimed is:

1. A ceramic dielectric material formed primarily of a composite of two component materials X and Y of the general formula $X_{1-A}Y_A$, the first of said two component materials being of the general formula:

$$X = \{BaO\}_x\{TiO_2\}_y\{(Sm_2O_3)_{1-m-n}(SrO \bullet CeO_2)_m (CaO \bullet CeO_2)_n\}_z;$$

and the second of said two component materials being of the general formula:

$$Y = SrTiO_3;$$

wherein, $0.1 \leq x \leq 0.25$, $0.6 \leq y \leq 0.85$, $0.05 \leq z \leq 0.3$, $0 \leq m \leq 0.80$, $0 \leq n < 0.8$, $x+y+z=1$, $m+n \leq 0.8$, $0 < A \leq 0.40$; and x, y, z, m, n, and A are expressed by mol fraction.

2. A method for producing a composite ceramic dielectric material comprising the steps:

(a) selecting starting materials from the group consisting of $BaCO_3$, $TiO_2$, $Sm_2O_3$, $CaCO_3$, $SrCO_3$, $CeO_2$, $Mn_2O_3$, $SrTiO_3$, for preparation as a composite material of two component materials X and Y in the general formula $X_AY_{1-A}$, the first of said two component materials being of the general formula:

$$X = \{BaO\}_x\{TiO_2\}_y\{(Sm_2O_3)_{1-m-n}(SrO \bullet CeO_2)_m (CaO \bullet CeO_2)_n\}_z;$$

and the second of said two component materials being of the general formula:

$$Y = SrTiO_3;$$

wherein, $0.1 \leq x \leq 0.25$, $0.6 \leq y \leq 0.85$, $0.05 \leq z \leq 0.3$, $0 \leq m \leq 0.80$, $0 \leq n < 0.8$, $x+y+z=1$, $m+n \leq 0.8$, $0 < A \leq 0.40$; and x, y, z, m, n, and A are expressed by mol fraction;

(b) weighing, compounding and mixing said selected starting materials of said first component material in proportions in accordance with said general formula for said first component material;
(c) calcinating said mixed materials;
(d) grinding said calcinated materials;
(e) mixing said second component material $SrTiO_3$ in said calcinated and ground materials in proportions in accordance with the general formula $X_{1-A}Y_A$;
(f) molding said mixed first and second component materials by applying pressure thereto to form a molded body; and
(g) holding the molded body so formed in an oxygen atmosphere at an elevated temperature for obtaining the composite ceramic dielectric material.

* * * * *